(12) United States Patent
Bok et al.

(10) Patent No.: US 7,168,528 B1
(45) Date of Patent: Jan. 30, 2007

(54) THREE RUN DISK BRAKE STACK AND METHOD OF ASSEMBLY

(75) Inventors: Lowell D. Bok, Anna, OH (US); Frank D. Edmisten, Troy, OH (US)

(73) Assignee: Goodrich Corporation, Brecksville, OH (US)

( * ) Notice: Subject to any disclaimer, the term of this patent is extended or adjusted under 35 U.S.C. 154(b) by 536 days.

(21) Appl. No.: 09/449,034

(22) Filed: Nov. 24, 1999

Related U.S. Application Data

(60) Provisional application No. 60/133,455, filed on May 11, 1999.

(51) Int. Cl.
*F16D 55/02* (2006.01)

(52) U.S. Cl. .................................. 188/71.7; 188/73.1
(58) Field of Classification Search ............ 188/71.5, 188/71.7, 218 XL, 73.1
See application file for complete search history.

(56) References Cited

U.S. PATENT DOCUMENTS

| | | | |
|---|---|---|---|
| 3,480,115 A | 11/1969 | Lallemant | |
| 3,712,427 A | * 1/1973 | Cook et al. | 188/251 A |
| 4,018,082 A | 4/1977 | Manoliu et al. | |
| 4,297,307 A | 10/1981 | Taylor | |
| 4,341,830 A | 7/1982 | Betts et al. | |
| 4,469,204 A | 9/1984 | Bok et al. | |
| 4,613,017 A | 9/1986 | Bok | 188/71.7 |
| 4,658,936 A | 4/1987 | Moseley | |
| 4,742,895 A | 5/1988 | Bok | 188/71.7 |
| 4,792,895 A | 12/1988 | Tallman | |
| 4,804,071 A | 2/1989 | Schultz et al. | |
| 4,878,563 A | 11/1989 | Baden et al. | |
| 4,977,985 A | 12/1990 | Wells et al. | 188/71.1 |
| 4,982,818 A | 1/1991 | Pigford | |
| 5,143,184 A | 9/1992 | Snyder et al. | |
| 5,217,770 A | 6/1993 | Morris, Jr. et al. | |
| 5,228,541 A | 7/1993 | Plude | |
| 5,248,017 A | 9/1993 | Schwarzbich | |
| 5,295,560 A | 3/1994 | Moseley | 188/71.5 |
| 5,312,660 A | 5/1994 | Morris et al. | |
| 5,323,880 A | 6/1994 | Wells et al. | 188/71.1 |
| 5,401,440 A | 3/1995 | Stover et al. | |
| 5,509,507 A | 4/1996 | Wells et al. | |
| 5,546,880 A | 8/1996 | Ronyak et al. | |
| 5,551,534 A | 9/1996 | Smithberger et al. | 188/71.5 |
| 5,609,707 A | 3/1997 | Bazshushtari et al. | |
| 5,662,855 A | 9/1997 | Liew et al. | |
| 5,759,622 A | 6/1998 | Stover | |
| 5,779,006 A | 7/1998 | Hyde et al. | |
| 5,992,577 A | * 11/1999 | Souetre | 188/71.5 |

FOREIGN PATENT DOCUMENTS

| | | | |
|---|---|---|---|
| CA | 2004091 | 5/1990 | |
| EP | 0840029 B1 | 7/2002 | |
| FR | 2755094 | 10/1996 | 188/71.5 |

\* cited by examiner

*Primary Examiner*—Jack Lavinder
*Assistant Examiner*—Melody M Burch
(74) *Attorney, Agent, or Firm*—Brinks Hofer Gilson & Lione

(57) ABSTRACT

In the invention there is provided a disk brake stack having disks with available wear portions of a first thickness, a second thickness and a third thickness. The disk(s) having an initial available wear portion of a first thickness are of a thickness so that at the first overhaul, the available wear portion of such disks are only partly worn away and disks are about equal to disks having an initial available wear portion of a second thickness. The disks having an initial available wear portion of a second thickness at the first overhaul are only partly worn away and such disks are about equal to the disks having an initial available wear portion of a third thickness. The disks initially having an available wear portion of a third thickness at the first overhaul are substantially fully worn away and are replaced by new or refurbished disks having an available wear portion of a first, second or third thickness. Also, the invention comprises a method of assembly and overhaul of a disk brake stack, utilizing disks having available wear portion of a first thickness, a second thickness, and a third thickness.

5 Claims, 4 Drawing Sheets

| RUN | CONFIG. | DISK POSITION | | | | | | |
|---|---|---|---|---|---|---|---|---|
| | | PP | R1 | S1 | R2 | S2 | R3 | EP |
| 1 | A | | | | | | | |
| 2 | B | | | | | | | |
| 3 | C | | | | | | | |

FIG-5

| RUN | CONFIG. | DISK POSITION | | | | | | |
|---|---|---|---|---|---|---|---|---|
| | | PP | R1 | S1 | R2 | S2 | R3 | EP |
| 1 | A | | | | | | | |
| 2 | B | | | | | | | |
| 3 | C | | | | | | | |

FIG-6

| RUN | CFG. | DISK POSITION | | | | | | | |
|---|---|---|---|---|---|---|---|---|---|
| | | PP | R1 | S1 | R2 | S2 | R3 | S3 | R4 | EP |
| 1 | A | | | | | | | | | |
| 2 | B | | | | | | | | | |
| 3 | C | | | | | | | | | |

THREE RUN DISK BRAKE STACK AND METHOD OF ASSEMBLY

This application claims the benefit of provisional application No. 60/133,455 filed May 11, 1999.

FIELD OF INVENTION

This invention relates to braking systems. In particular, this invention relates to multi-disk brake systems used in vehicles. More particularly, this invention relates to aircraft disk brake systems. The brake disk assembly contains a brake disk stack, which comprises an end plate, a pressure plate and interleaved rotors and stators. The available wear portions of the rotors and stators have different wear thicknesses, so that the thickest disks in the stack are refurbished or replaced after three service runs. The mid-thickness disks are replaced or refurbished after two service runs and the thin disks are replaced or refurbished after one service run. Furthermore, this invention relates to a method of assembly of a disk brake stack having disks of different thicknesses.

BACKGROUND OF THE INVENTION

Aircraft brake systems have brake disk stacks comprised of interleaved rotor and stator disks. The disks are alternatively splined to the rotatable wheel and stationary (non-rotatable) torque tube. An end plate is provided at one end of the stack, while an axially moveable pressure plate is provided at the other end of the stack. Upon application of force to the pressure plate, the disks frictionally engage and provide braking activity to the vehicle.

Generally in the past, brakes have been assembled with the available wear portions of the rotors and stators having the same available wear thickness. These brakes were operated until all the wear portions of the disks were fully worn. At that time, the disks were removed and replaced with new unworn disks or refurbished or reworked disks. The heat sink mass of the brake is reduced by the total wear of all the disks in the brake stack. The heat sink mass must be above a certain level to hold the operating temperature of the brake down. Due to the size and weight limitations on aircraft, the thickness of available wear portions is also limited. The thickness of the available wear portions controls the number of landings between the replacement or refurbishing of the disks. The piston cylinder assemblies for actuating the brakes also have a length determined by piston travel, which is a function of the total wear of the disks. Where the brake is operated until all disks are fully worn, the piston travel is increased and accordingly the total brake envelope is increased as well as weight of the brake assembly. The brake envelope includes a heat sink envelope which is the distance between the end of the piston or thrust member facing the brake stack and the backing plate or reaction member.

Various different brake configurations have been proposed to minimize the turnaround time, maximize the brake cooling, reduce the amount of piston travel, as well as the size and the weight of the brake, while at the same time retaining a substantial portion of the heat sink mass to a lower operating temperature. For example, U.S. Pat. No. 3,480,115 to Lallemant discloses a brake, which comprises two groups of coaxial disks. The first group of coaxial disks is smooth since the disks are not equipped with a friction lining. The second group of disks has a friction lining. The disks of the first group are disposed alternatively with the disks of the second group. The disks of one group are angularly coupled to a rotatable structure such as an aircraft wheel and the disks of the other group are coupled to a non-rotating structure. Lallemant discloses various embodiments in which the disks of at least one of the two groups have thicknesses that vary from one disk to another depending upon the axial position of the disks. The thicker disks have greater thermal capacities due to their greater mass. According to Lallemant, the purpose of these various embodiments is to provide multiple disk brakes that fulfill the requirements of practice, particularly with respect to their longevity, uniformity of braking efficiency and conditions in which maintenance operations can be carried out. Furthermore, Lallemant contemplates the possibility of re-machining the smooth disks and moving these disks to a new axial position in the brake for which new axial position the reduced thickness that has been given to the smooth disks is adapted to the working conditions corresponding to the new position. Lallement alleges that the overall thermal capacity of the brake is not affected by the re-machining of the smooth disks and therefore, the efficiency of such brakes is constant.

U.S. Pat. No. 4,613,017 to Bok discloses a method of assembling and overhauling a disk brake having a plurality of disks with available wear portions of predetermined different thicknesses. The method comprises positioning first a first group of disks in overlapping relationship with a second group of disks. The first group of disks have an available wear portion of a first thickness and the second group of disks have an available wear portion of a second thickness which is greater than the thickness of the first group of disks. A third group of disks having a third thickness at an intermediate overhaul replace the first group of disks when the available wear portions of the first group of disks are substantially fully worn. The third group of disks have a third thickness which is greater than the thickness of each of the available wear portions of the second group of the disks at intermediate brake overhaul time.

Similarly, U.S. Pat. No. 4,742,895 to Bok discloses a carbon disk brake assembly. The assembly comprises a plurality of disks in which the first group of disks, for example, the stators and end plates, have an available wear portion of a first thickness which is less than and preferably one half of the thickness of the wear portions of the second group of disks, in this example, rotors. After a predetermined number of landings, the stators and end plates will be substantially fully worn. These worn stators and end plates are replaced by a third group of disks, which are new or refurbished stators and end plates. Preferably, the wear thickness of this third group of disks is double the thickness of the available wear portions of the rotors at the intermediate overhaul. The brake assembly is then operated to another intermediate overhaul when the available wear portions of the rotors will be fully worn and replaced by new or refurbished rotors.

U.S. Pat. No. 4,977,985 to Wells, et al. discloses a method of carrying out the maintenance of a multi-disk brake. The disks can be made of a carbon—carbon material. The brake comprises a stack of interleaved rotor and stator disks provided between a thrust member and a reaction member. The rotor and stator disks are selected and arranged so that the wear allowance of a set of disks at one end of the stack is less than the wear allowance of a set of disks at the other end of the stack. A fully worn group of disks is removed from one end of the stack during brake service operation following wear. The remaining partially worn disks are axially moved or shifted to a new position towards the one end of the stack. An unworn stack of disks is added at the other end of the stack.

Similarly, U.S. Pat. No. 5,323,880 to Wells, et al. discloses a multi-disk brake system. The brake comprises a stack of interleaved rotor and stator disks disposed in an axially aligned relationship. The disks are made of a carbon—carbon material, which provides the frictional surfaces of the disk as well as their structural integrity. The stack of disks comprises a first group of adjacent rotors and stators and a second group of adjacent rotors and stators in an axially aligned relationship with the first group. Each wear surface of the first group which confronts a wear surface of an adjacent disk of the first group is unworn. Each wear surface of a disk of the second group which confronts a wear surface of an adjacent surface of the second group is partly worn. Each group has an end disk, which confronts an end disk of the other group. The confronting wear surfaces of the end disks are either both unworn or are both partly worn.

U.S. Pat. No. 5,509,507 to Wells et al. discloses a multi-disk brake system for aircraft. This brake system comprises a stack of interleaved rotor and stator disks made of carbon—carbon material and disposed in an axially aligned relationship between a thrust device and a reaction member. The stack comprises a first group of adjacent rotor and stator disks and a second group of adjacent rotor and stator disks with the two groups in an axially aligned relationship. Only one disk of the first group contacts a disk of the second group. Each group has an end disk which confronts an end disk of the other group. The wear surfaces of the disks of the first group are thicker than the wear surfaces of each of the disks of the second group. At an intermediate overhaul time, after a predetermined number of brake applications, each wear surface of the first group which confronts a wear surface of an adjacent disk of the first group is only partly worn away, whereas each wear surface of a disk of the second group which confronts a wear surface of an adjacent disk of the second group is substantially fully worn away. Also at the intermediate overhaul, the confronting wear surfaces of the end disks are either both only partly worn away or both substantially worn away.

U.S. Pat. No. 5,295,560 to Moseley discloses a thermally balanced brake stack. The brake stack comprises a plurality of stator disks, a plurality of rotor disks interleaved with said stator disks, a pressure plate at one end of the stack and an end plate at the other end of the stack. The rotor and stator disks at the first and second end are thinner than the rotor disks at the center portion of the stack. According to the patent, this configuration minimizes the rate of temperature increase at the center of the stack while enabling quicker dissipation of heat at the end of the brake disk stack.

A pressure balanced brake stack is disclosed in U.S. Pat. No. 5,551,534 to Smithberger et al. The brake stack comprises a plurality of rotor disks, a plurality of stator disks interleaved with said rotor disks, a pressure plate at a first end of the stack and an end plate at the second end of the stack. The rotor disks at the first and second ends of the stack are thicker than the rotor disks adjacent thereto. Due to this configuration according to the patentee, the rotor disks at the first and second ends will deflect less and distribute pressure more uniformly throughout the stack.

SUMMARY OF INVENTION

The present invention comprises a novel disk brake assembly construction. The disk brake is assembled with disks having three different wear portion thicknesses which enables the thickest disks to go through three service runs prior to being replaced or refurbished. A run is defined as a service operation between brake overhauls. A brake overhaul is made after a predetermined number of landings, or when the disks having the thinnest wear portions are fully worn. A brake wear limit indicator is preferably used to determine when a brake overhaul is necessary.

The brake stack includes, in addition to an end plate and pressure plate, rotors and stators. The end plate and pressure plate have only one wear surface, while rotors and stators each have two wear surfaces. The rotors are interleaved with the stators. The rotors, stators end plate and pressure plate are of three different sizes: a thick disk, a mid-thickness disk and a thin disk. The thick disks in the brake stacks are then subject to numerous landings and worn until they become mid-thickness disks, while the mid-thickness disks are worn until they become thin disks, and, the thin disks are worn to the minimum allowable disk thickness, at which time they are removed from the stack. At each overhaul, the fully worn thin disks are replaced with new or refurbished disks. By this configuration, a thick disk can go through three separate service runs prior to being replaced, where a mid-thickness disk can go through two service runs prior to being replaced and a thin disk can go through one service run prior to being replaced. If desired, at overhaul, following a service run, the disks can be moved to different positions within the stack or reversed. Alternatively, refurbished disks removed after a service run in a brake stack can be reinstalled in any stack, they do not have to go back to the same stack. Therefore, this unique configuration provides for increased longevity of the individual disks of the brake stack, while maintaining the same brake envelope. This provides a substantial cost savings for replacement of worn disks since only the thin disks are replaced at each overhaul.

Alternatively, the invention provides additional design flexibility to a brake designer. Where the brake envelope remains constant, the configuration allows an increase in worn heat sink mass and associated increased energy capacity while maintaining the same disk life as in prior known brake stack configurations. If size and weight considerations dominate the brake design constraints, the brake envelope can be reduced, using this inventive configuration to provide a more compact and lower weight brake assembly while maintaining the same disk life. Another alternative benefit of the inventive configuration is an increase in worn heat sink mass and associated energy capacity as well as increased disk life where the brake envelope and minimum disk thickness must remain constant.

In one aspect of the invention, there is provided a disk brake stack having disks with available wear portions of a first thickness, a second thickness and a third thickness. The disk(s) having an initial available wear portion of a first thickness are of a thickness so that at the first overhaul, the available wear portion of such disks are only partly worn away and disks are about equal to disks having an initial available wear portion of a second thickness. The disks having an initial available wear portion of a second thickness at the first overhaul are only partly worn away and such disks are about equal to the disks having an initial available wear portion of a third thickness. The disks initially having an available wear portion of a third thickness at the first overhaul are substantially fully worn and are replaced by new or refurbished disks having an available wear portion of a first thickness, second thickness, or third thickness, provided that the desired configuration of the brake stack is maintained.

In accordance with another aspect of the invention, there is provided a method of assembling a brake disk stack having disks with available wear portions of three different predetermined thicknesses. The disk(s) are subjected to a number of landings (based on the available wear portions of the disks having the least (thinnest) available wear portions) and then the brake stack is overhauled. At the first overhaul, the disk(s) having the available wear portions of a first thickness are approximately equal to disks having the initial available wear portion of a second thickness. The disks having the initial available wear portion of a second thickness are partly worn and at the first overhaul are approximately equal to the thickness of the disks having the initial available wear of a portion of a third thickness. The disks having an initial available wear portion of a third thickness, are substantially fully worn and at the first overhaul are replaced with new or refurbished disks of a first, second or third thickness, provided that the desired configuration of the brake stack is maintained.

For a complete understanding of the objects, techniques and structure of the invention, reference should be made to the following detailed description and accompanying drawings.

BRIEF DESCRIPTION OF THE DRAWINGS

FIG. 5 is a table representing a brake stack comprising three rotors having an alternate configuration and showing the thickness of disks after each overhaul.

FIG. 6 is a table representing a brake stack comprising three rotors having an alternate configuration and showing the thickness of disks after each overhaul.

FIG. 7 is a table representing a brake stack comprising four rotors, showing the thickness of disks after each overhaul.

FIG. 8 is a table representing a brake stack comprising five rotors, showing the thickness of disks after each overhaul.

FIG. 9 is a table representing an alternate configuration of a brake stack comprising five rotors showing the thickness of disks after each overhaul.

DETAILED DESCRIPTION

Figure 1:
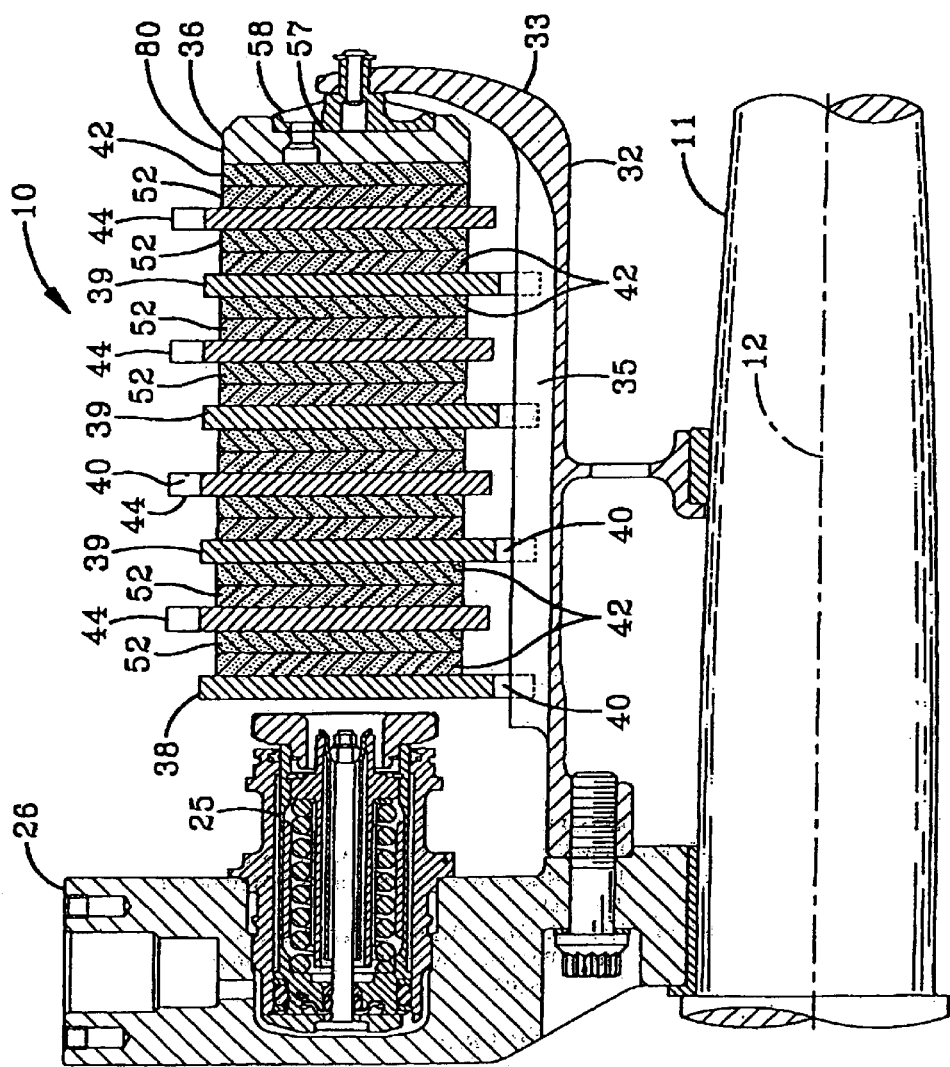
FIG. 1 is a schematic cross-sectional view of an aircraft brake assembly showing a piston housing with an actuating cylinder, pressure plate, torque tube and brake stack.

A friction brake mechanism 10 mounted on axle 11 for use with a cylindrical wheel rotatable about axial centerline 12 in a manner fully described in U.S. Pat. No. 4,018,082 to Rastogi et al., U.S. Pat. No. 4,878,563 to Baden et al., and U.S. Pat. No. 5,248,013 to Hogue et al. is shown in FIG. 1. The friction brake mechanism 10 includes a pressure plate 38 adjacent a thrust member, preferably a hydraulic piston 25, an end plate 36 distal from the pressure plate, and a plurality of interleaved rotor disks 44 and stator disks 39 which together form the brake heat sink or brake stack disposed therebetween. The friction brake mechanism 10 also includes a torque tube 32 on which the pressure plate 38, and stator disks 39 are slidably mounted against rotation relative to the wheel and rotor disks 44. End plate 36 is also mounted against rotation relative to the wheel and rotor disks.

Torque tube 32 includes a reaction plate 33 at its end, distal the thrust member piston 25. The reaction plate 33 may be made integral with the torque tube 32, as shown in FIG. 1, or may be made as a separate annular piece and suitably connected to the stationary torque tube 32. Torque tube 32 has a plurality of circumferentially spaced splines 35 that are axially extending. Splines 35 on torque tube 32 support an axially moveable nonrotatable pressure plate 38 and axially moveable nonrotatable stator disks 39. Stator disks 39 and pressure plate 38 have notches 40 in the form of slotted openings at circumferentially spaced locations on their inner periphery for captive engagement by the spline members 35 and is old and well known in the art. In a preferred embodiment, the stator disks 39 each have friction linings secured to opposite faces. In such embodiment, the pressure plate face which abuts a rotor also has a friction lining on that surface. Similarly, in this embodiment, the end plate face which abuts a rotor has a friction lining.

Axially spaced rotor disks 44 are interleaved between the pressure plate 38, the stator disks 39 and end plate 36. The rotor disks have a plurality of circumferentially spaced notches 40 along their outer periphery for engagement by corresponding ribs secured to or integral with the inner periphery of the wheel in a known manner (not illustrated).

Stator disks 39 and rotor disks 44 act together during a braking action to provide a heat sink. The number and size of the disks used in the brake stack may be varied as is necessary for the application involved. The circumferentially spaced notches 40 on the stator disks and the rotor disks may accommodate reinforcing inserts which are fully described in U.S. Pat. No. 4,469,204 to Bok et al. The reinforcing inserts (not shown), sometimes referred to as drive clips, provide reinforcement to the walls of such slotted openings and enhance the life of such slots.

The actuating mechanism for the brake includes a plurality of hydraulic piston assemblies 25 circumferentially spaced around the annular piston housing 26 in a known manner. Only one piston assembly is shown in FIG. 1. Upon actuation by fluid pressure, the piston assembly 25 effects a braking action by moving the pressure plate 38 and the stator disks 39 into frictional engagement with the rotor disks 44 and against the reaction plate 33. Alternatively, other alternate means (not illustrated) such as an electromechanical actuator or thrust means may be provided to effect movement of the pressure plate.

The pressure plate 38 may be formed of the same material as the rotors and stators disposed therebetween and described below. Preferably, the pressure plate 38 is formed of carbon or ceramic composite material and has an annular friction lining 42 of carbon or ceramic composite material opposite to the face of a pressure plate that receives the head of the hydraulic piston 25. The pressure plate 38 is engaged to the torque tube 32 via slotted opening at circumferentially spaced locations on its inner periphery.

The construction of the end plate 36 is dependent on the design of the reaction end of the torque tube 32. As shown in FIG. 1, where the torque tube 32 includes a flared reaction end having a plurality of torque transfer buttons 58 secured thereto, the carrier 80 of the end plate 36 may be provided with a plurality of torque transfer recesses 57 for engagement with the plurality of torque transfer buttons 58. The end plate may have a friction lining 42 which may be secured to a plurality of rivets (not shown). Alternatively, and in known manner, where the design of the torque tube provides a series of splines for engagement by corresponding notches formed on the inner periphery of the carrier end plate, the end plate 36 may be of a construction similar or identical to that of the pressure plate 38.

The rotor disks and the stator disks are made of any material capable of maintaining the desired properties of the disk as well as the structural integrity of the disk upon repeated brake applications or aircraft landings. The disk may be a solid disk in which the entire disk is made of a single, integral piece of material that has both structural and frictional properties. Other examples of disks include steel brake disks, carbon disks (solid or segmented), composite friction disks or any combination thereof. Illustrative, although not limiting examples of methods to form carbon brake disks are set forth in U.S. Pat. Nos. 5,143,184; 4,982,818; 4,804,071; 4,341,830; 4,297,307; 5,546,880; 5,662,855; 5,609,707; 5,312,660 and 5,217,770. These patents are listed solely as examples and are not intended to set forth the bounds and limitations of the brake disks which can be used in this invention. Furthermore, it may be desirable as well as preferable to include oxidation protection on disks that are made of carbon—carbon composites. Preferably, the oxidation of the brake disks is inhibited by the methods and compositions as set forth in U.S. Pat. Nos. 5,401,440 and 5,759,622, which are incorporated herein by reference.

Desirably, the brake disks also have available wear surfaces which can be refurbished or replaced and therefore enabling the disks to be reused in the brake disk stack. Preferably, the available wear surface is a friction lining formed of any suitable material chosen primarily for its frictional, wear resistance, thermal conductivity, and heat capacity properties and secondarily for its structural and oxidation resistance properties. For example, the friction lining can be formed of carbon, metallic, and/or ceramic material.

In one preferred embodiment, composite friction brake disks having replaceable wear faces as described in U.S. Pat. No. 5,779,006 are used in the brake stack. The disks described in this patent are preferably used in the instant invention since the disk configuration improves the dynamic stability against undesired vibration of the brakes during aircraft braking. If disks employing such a replaceable friction lining are used, the friction lining is preferably in the form of an annular ring of a size corresponding to the respective disk. The friction lining may be attached by any suitable means available. For example, the friction lining, if annular, may be attached by rivets or clips. As shown in FIG. 1, each stator friction lining 42 has a flat annular wear face or rubbing face adapted for engagement with the opposing wear face of an adjacent rotor lining 52. An alternative design such as described in U.S. Pat. No. 5,779,006 could be used where the friction lining does not directly engage the drive keys of the wheel or splines of the torque tube so that the friction lining need not have the structural strength required of conventional disks formed entirely of carbon material.

As described herein, the invention contemplates a three-run overhaul scheme, meaning that a thick disk has a wear allowance which can be used for three full service runs before being replaced or refurbished. A brake wear limit indicator, as is well know in the art, can be used to determine when a brake overhaul is necessary. U.S. Pat. Nos. 5,228,541 and 4,658,936 are examples of such indicators. The rotors and stators of the disk brake assembly of the instant invention have three different thicknesses: a first thickness (thick), a second thickness (mid) or a third thickness (thin). Similarly, the end plate and the pressure plate may have different thicknesses. Preferably, the pressure plate and the end plate are initially of a first thickness. The disk(s) having an initial available wear portion of a first thickness (1) are of a thickness so that at the first overhaul, the available wear portion of such disks are only partly worn away and the disks are about equal to disks having an initial available wear portion of a second thickness. The disks having an initial available wear portion of a second thickness (2) at the first overhaul are only partly worn away and such disks are about equal to the disks having an initial available wear portion of a third thickness. The disks initially having an available wear portion of a third thickness (3) at the first overhaul are substantially fully worn and are replaced by new or refurbished disks having an available wear portion of a first, second, or third thickness.

If the disks are formed as a single integral or monolithic structure, such as that shown and described in U.S. Pat. Nos. 4,613,017 and 4,792,895 for example, it is contemplated that a refurbished disk can be formed by two worn disks joined together by any mechanical means to form a disk of desired thickness. For example, it is contemplated that a thick or mid-thickness disk can be formed by the mechanical joining of two thin disks. The thin disks are replaced at each overhaul, whereas mid-thickness disks go through two service overhauls before being replaced.

Moreover, the disks do not necessarily remain in the same position in the stack or in the same stack at each overhaul. Any of the partially worn disks can be moved to a different position in the stack or reversed or both or placed in another stack, if desired. Furthermore, if desired, the partially worn disks remaining in the stack can be machined so as to provide flat wear surfaces confronting adjacent disks of each newly assembled stack at each overhaul. The amount the partially worn disks are machined is predetermined depending upon the anticipated characteristic uneven wear pattern of the disks and incorporated into the initial thickness determination.

The exact thickness for the disks having an available wear portion of a first, second, and third thickness as well as the size and the number of disks varies greatly depending upon the exact aircraft the brake will be used in. The exact size and thickness dimensions are well within the skill of one of ordinary skill in the art. For purposes of an example, and not limiting the invention, the disk forming the rotors and the stators having an available wear portion of a first thickness can be about 1.80 inches thick. In this same embodiment, the disks forming the rotors and stators having an available wear portion of a second thickness can be approximately 1.40 inches thick. The disks forming the rotors and stators having an available wear portion of a third thickness can be approximately 1.00 inches thick. At the first overhaul, the thick disks are worn approximately 0.180 inches on each wear face to result in a disk having a wear portion approximately of the initial mid-thickness disk. In this particular embodiment, 0.020 inches is machined away from each wear face of each worn thick disk resulting in a disk having a wear portion the same as an initial mid-thickness disk. Similarly, at this overhaul, the mid-thickness disks are worn approximately 0.180 on each wear face to result in a disk having wear portions approximately those of the initial third thickness disks. In this particular embodiment, 0.020 inches is machined away from each wear face of each worn mid-thickness disk, resulting in a disk having a wear portion the same as an initial third thickness disk. At this first overhaul, the worn disks having an initial third thickness are discarded or refurbished.

Figure 2:
FIG. 2 is a table representing a brake stack comprising three rotors showing the disks after each overhaul.
Figure 3:
FIG. 3 is a table representing a brake stack comprising three rotors having an alternate configuration and showing the thickness of disks after each overhaul.

FIG. 2 illustrates a three run scheme pursuant to this invention using a three-rotor disk configuration. The pressure plate (PP) is at one end of the brake assembly and the end plate (EP) at the other end of the stack. In all these configurations, the pressure plate and the end plate remain in the same position for all three runs. In the descriptions, EP refers to the end plate, PP refers to the pressure plate, R1, the first rotor, R2, the second rotor and so forth. Similarly, S1 and S2 refer to the first and second stators, respectively. For illustrative purposes only, the first rotor (R1) abuts the pressure plate as seen in the FIGS. 2–9. Initially, in this embodiment, the pressure plate and the end plate, as well as the first rotor have available wear portions of a first thickness. This embodiment is shown in Run 1, Configuration A, FIG. 2. The first stator (S1) and the second rotor (R2) have available wear portions of a second thickness. The second stator (S2) and the third rotor (R3) have available wear portions of a third thickness. At the first overhaul, the second stator and the third rotor disks are removed from the stack since they are substantially fully worn. The first rotor, first stator, and second rotor disks are moved to the second rotor, the second stator and third rotor position, respectively. If desired, these disks can be machined and then installed in these positions. Disks having an available wear portion of a first thickness are placed in the first rotor and the first stator positions. The pressure plate and the end plate are worn only on one side during use to approximately the same thickness as the disks having an initial wear portion of a second thickness for each of these positions. If desired at overhaul, the pressure plate and end plate are machined and reinstalled in the same position. The reassembled brake stack is shown in Run 2, Configuration B, FIG. 2.

At the second overhaul, the disks of the second stator and the third rotor are removed. The first stator, first rotor and second rotor disks are moved to the second stator, the second rotor and third rotor positions, respectively. If desired, these disks can be machined and then installed into their respective positions. The pressure plate and the end plate remain in the same position. Similarly, if desired, the pressure plate and the end plate can be machined and reinstalled in the same position. This reassembled brake stack is shown in Run 3, Configuration C, FIG. 2. At the third overhaul, the pressure plate, end plate and the third rotor are removed. The first rotor and second rotor disks are moved to the second rotor and third rotor positions, respectively. If desired, these disks can be machined prior to their installation into these positions. Also, any disks which remain in the same position can be machined and reinstalled into their respective positions. At this third overhaul, disks having an available wear portion of a first thickness are then placed in the positions of the pressure plate, first rotor and end plate. At this point, the brake disk configuration is the same as the initial configuration of the brake disk system.

An alternate configuration to the three-rotor, three-run overhaul scheme described above is set forth in FIG. 3. In this configuration, (Run 1, Configuration A, FIG. 3), the pressure plate, end plate and first rotor have available wear portions of a first thickness. The first stator and the third rotor have available wear portions of a third thickness and the second rotor and second stator have available wear portions of a second thickness. At the first overhaul, the first stator and the third rotor disks are removed. The first rotor and second rotor disks are moved to the third rotor and first rotor positions respectively. If desired, these disks can be machined prior to their installation into these respective positions. New or refurbished disks having an available wear portion of a first thickness are placed into the second rotor and the first stator positions at this first overhaul. The end plate, pressure plate and second stator disks remain in the same position, and if desired, can be machined and reinstalled into their respective positions. The reassembled brake stack is shown in Run 2, Configuration B, FIG. 3.

At the second overhaul, the first rotor disk as well as the second stator disks are removed. New or refurbished disks having an available wear portions of a first thickness are placed in the second stator and third rotor positions. The disk in the second rotor position is moved to the first rotor position, whereas the disk in the third rotor position is moved to the second rotor position. The pressure plate, end plate and first stator remain in the same position. If desired, all disks, other than the first thickness disks are machined and reinstalled in the same positions. The reassembled brake stack is shown in Run 3, Configuration C, FIG. 3. At the third overhaul, the end plate, pressure plate and the second rotor are removed. New or refurbished disks having an available wear portion of a first thickness are placed into the end plate, pressure plate and first rotor positions. The third rotor disk is moved into the second rotor position, whereas the first rotor disk is moved into the third rotor position, the first and second stator remain in the same position. If desired, all disks other than the first thickness disks are machined and reinstalled into their respective positions. After this third overhaul, the brake configuration is identical to the initial brake configuration.

Figure 4:
FIG. 4 is a table representing a brake stack comprising three rotors having an alternate configuration and showing the thickness of disks after each overhaul.

Yet another embodiment of the three-rotor, three-run overhaul scheme is set forth in FIG. 4. In this configuration, at the start, (Run 1, Configuration A, FIG. 4) the pressure plate, end plate and first rotor have available wear portions of a first thickness. The first stator and the third rotor have an available wear portions of a third thickness whereas the second rotor and the second stator have an available wear portion of a second thickness. At the first overhaul, the first stator and the third rotor disks are removed. The first rotor, second rotor and second stator disks are moved to the second rotor, third rotor, and first stator positions respectively. If desired, these disks are machined and then installed into these positions. Disks having an available wear thickness of a first thickness are placed in the first rotor and the second stator positions. The end plate and the pressure plate can be machined and reinstalled into the same positions. The reassembled brake stack is shown in Run 2, Configuration B, FIG. 4.

At the second overhaul, the first stator and third rotor disks are removed. The first rotor, second rotor, and second stator disks are moved to the second rotor, third rotor, and first stator positions respectively. If desired, these disks may be machined prior to their placement in these positions. Similarly, the end plate and the pressure plate can be machined and reinstalled in the same position. Disks having an available wear portion of a first thickness are placed in the positions of the first rotor and the second stator. The reassembled brake stack is shown in Run 3, Configuration C, FIG. 4.

At the third overhaul, the pressure plate, the end plate and the third rotors are removed since they are substantially fully worn. The first rotor and second rotor disks are moved to the second rotor and third rotor positions, respectively. If desired, these disks may be machined prior to their placement in these positions. Similarly, the first stator and second stator disks can be machined and reinstalled in the same position. Disks having an available wear portion of a first thickness are placed in the positions of the pressure plate, end plate and the first rotor. The configuration at this point is the same as the initial configuration of the brake stack.

FIG. 5 illustrates yet a further embodiment of the invention using a three rotor brake and three run configuration.

Initially, (Run 1, Configuration A, FIG. 5) disks having an available wear thickness of a first thickness are placed in the positions of the pressure plate, the end plate and the first rotor. Disks having an available wear portion of a second thickness are placed in the positions of the second rotor and the second stator. Disks having an available wear portion of a third thickness are placed in the positions of the first stator and the third rotor.

At the first overhaul, the first rotor and second rotor disks are moved to the second rotor and third rotor positions, respectively. If desired, these disks can be machined prior to their placement in these positions. The disks in the first stator and the third rotor positions are removed. Disks having an available wear portion of a first thickness are placed in the first rotor and the first stator positions. The end plate, the pressure plate and second stator can be machined and reinstalled in the same position, if desired. The reassembled brake stack is shown in Run 2, Configuration B, FIG. 5.

At the second overhaul, the second stator and the third rotor are substantially fully worn and the disks are removed. The first rotor and second rotor disks are moved to the second rotor and third rotor positions, respectively. If desired, these disks can be machined prior to their installation into their intended positions. Disks having an available wear portion of a first thickness are placed in the position of the first rotor and the second stator. The pressure plate, end plate, and first stator can be machined and reinstalled in the same position, if desired. The reassembled brake stack is shown in Run 3, Configuration C, FIG. 5.

At the third overhaul, the disks in the first rotor and the second rotor positions are moved to the second and the third rotor positions, respectively. These disks can be machined prior to their movement to these respective positions. The pressure plate, the end plate as well as the third rotor are removed. Disks having an available wear portion of a first thickness are placed in the positions of the pressure plate, the first rotor and the end plate. The first stator and second stator disks can be machined and reinstalled in the same position, if desired. This configuration is then identical to the initial configuration.

FIG. 6 illustrates yet an additional further embodiment of the invention using a three rotor brake and three run configuration. Initially, (Run 1, Configuration A, FIG. 6) disks having an available wear thickness of a first thickness are placed in the positions of the pressure plate, the end plate and the first rotor. Disks having an available wear portion of a second thickness are placed in the positions of the second rotor and the second stator. Disks having an available wear portion of a third thickness are placed in the positions of the first stator and the third rotor.

At the first overhaul, the second rotor and second stator disks are moved to the third rotor and first stator positions, respectively. If desired, these disks can be machined prior to their placement in these positions. The disks in the first stator and the third rotor positions are removed. Disks having an available wear portion of a first thickness are placed in the second rotor and the second stator positions. The end plate, the pressure plate and first rotor can be machined and reinstalled in the same position, if desired. The reassembled brake stack is shown in Run 2, Configuration B, FIG. 6.

At the second overhaul, the first stator and the third rotor are substantially fully worn and the disks are removed. The first rotor, second rotor, and second stator disks are moved to the second rotor, first rotor and first stator positions, respectively. If desired, these disks can be machined prior to their installation into their intended positions. Disks having an available wear portion of a first thickness are placed in the position of the second stator and third rotor. The pressure plate, and end plate can be machined and reinstalled in the same position, if desired. The reassembled brake stack is shown in Run 3, Configuration C, FIG. 6.

At the third overhaul, the disks in the first rotor and the third rotor positions are moved to the third and the second rotor positions respectively. These disks can be machined prior to their movement to these respective positions. The pressure plate, the end plate as well as the second rotor are removed. Disks having an available wear portion of a first thickness are placed in the positions of the pressure plate, the first rotor and the end plate. The first stator and second stator disks can be machined and reinstalled in the same position, if desired. This configuration is then identical to the initial configuration.

As seen from these various embodiments, it is possible to rearrange the disks for each configuration provided that the minimum disk thickness and overall heat sink length and mass meet the specified requirement for each configuration. Furthermore, orientation of the disk wear surfaces is not critical, if the wear surfaces of the disks are machined at each overhaul. Preferably, the disks are machined flat prior to reuse in another brake stack. With the re-machining, the disk has no record of its past position and can be used in any other brake stack.

FIG. 7 illustrates a four rotor, three run overhaul scheme according to the instant invention. In the illustrated embodiment, as well as the following explanation, the pressure plate and end plate in the 4-rotor heat sink configuration are considered to be separate complete disks, even though these disks have a wear surface on only one side. Therefore, the 4-rotor heat sink configuration is comprised of nine disks: three first thickness disks, three second thickness disks, and three third thickness disks. In this configuration, three disks are replaced after each overhaul. In this configuration, (Run 1, Configuration A, FIG. 7) the first rotor, second stator and fourth rotor (R4) have available wear portions of a first thickness. The first stator, third rotor and end plate have an available wear portion of a second thickness, whereas the pressure plate, second rotor and third stator (S3) have an available wear portion of a third thickness.

At the first overhaul, the pressure plate, second rotor and third stator are removed since they are substantially worn. Disks having an available wear portion of a first thickness are placed in these positions. All other disks remain in the same position. The reassembled brake stack is shown in Run 2, Configuration B, FIG. 7.

At the second overhaul, the first stator, third rotor and the end plate are removed since they are substantially worn. Disks having an available wear portion of a first thickness are placed in these positions. All other disks remain in the same position. The reassembled brake stack is shown in Run 3, Configuration C, FIG. 7. At the third overhaul, the first rotor, second stator and the fourth rotor are removed since they are substantially worn. Disks having an available wear portion of a first thickness are placed in these positions. At this point, the brake stack configuration is the same as the initial configuration of the brake disk system. Furthermore, the worn disks at each overhaul can be machined and reinstalled in their respective positions. Similarly, the brake disks, if desired, can be rearranged to any other position requiring disks of the same thickness or any other combination having the same overall stack length during each overhaul.

Figures 8, 9:
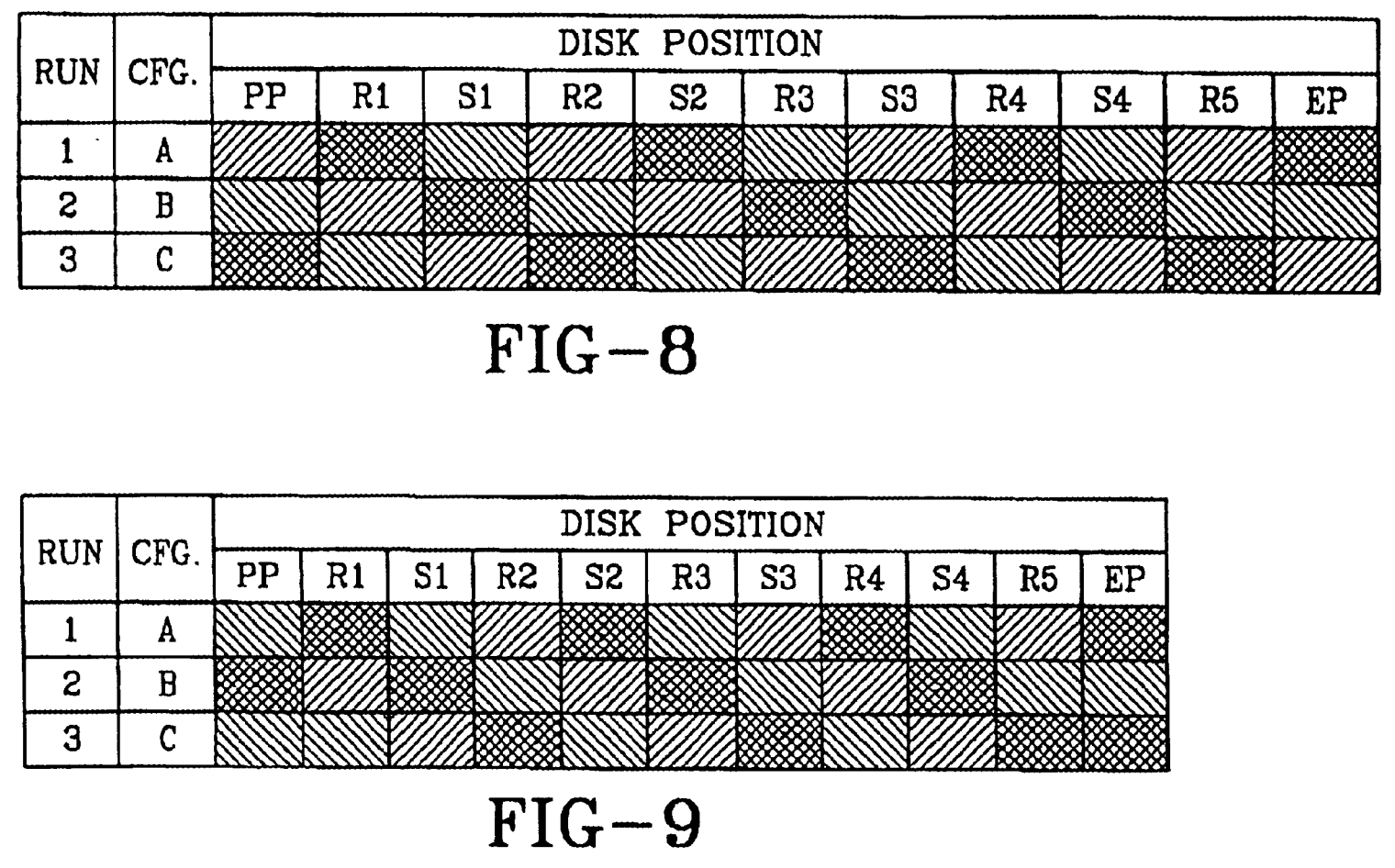

FIG. 8 illustrates a 5-rotor configuration. In this configuration, the pressure plate and end plate are again considered to be separate complete disks, even though those disks have a wear surface on only one side. Therefore, the 5-rotor configuration is comprised of 11 disks. A three-run operation and a constant overall brake stack length is achieved by maintaining a constant combined thickness for the pressure plate and end plate for each configuration, as described herein.

In the initial configuration, as seen in Run 1, Configuration A, FIG. 8, the pressure plate, second rotor, third stator, and fifth rotor (R5) are of a first thickness. Also at this initial configuration, the first rotor, second stator, fourth rotor, and end plate are of a third thickness, whereas the first stator, third rotor, and fourth stator (S4) are of a second thickness.

At the first overhaul, the first rotor, second stator, fourth rotor, and end plate are substantially worn and are removed. The first rotor, second stator, and fourth rotor are replaced with disks having a wear portion of a first thickness. The end plate is replaced with a disk having a wear portion of a second thickness. If desired, these disks can be machined prior to their placement into their intended positions. All other disks remain in the same position. Similarly, if desired, these remaining disks can be machined and reinstalled in the same position. The reassembled brake stack is shown in Run 2, Configuration B, FIG. 8.

At the second overhaul, the first stator, third rotor, and fourth stator are substantially worn and are removed and replaced with disks having a wear portion of a first thickness. The end plate, which is partially worn to become a third thickness disk is removed and is stored for future use in a Configuration A brake stack. A first thickness disk is installed in the end plate position. The reassembled brake stack is shown in Run 3, Configuration C, FIG. 8.

At the third overhaul, the pressure plate, second rotor, third stator, and fifth rotor are substantially worn and are removed and replaced with disks having a wear portion of a first thickness. The end plate, which is partially worn to become a second thickness disk is removed and is stored for future use in a Configuration B brake stack. A third thickness disk is installed in the end plate position. After this third overhaul, the brake stack is identical to the initial Configuration A. Similarly, the worn brake disks can be machined first and reinstalled into their respective positions at each overhaul. With this method, it is possible to use disks of a first, second, and/or third thickness in all positions, and to maintain a constant overall brake stack length. Alternatively, the rotors and stators can be rearranged within the stack to modify the thermal profile of the resulting brake stack.

FIG. 9 illustrates an alternate five rotor, three run overhaul configuration. The end plate and pressure plate used in this configuration are designed to be subject to two runs and are used as second or third thickness disks only. In the initial configuration as seen in Run 1, Configuration A, FIG. 9, the second rotor, third stator and the fifth rotor (R5) are of a first thickness. Also at this initial configuration, the first rotor, second stator, fourth rotor and end plate are of a third thickness, whereas the pressure plate, first stator, third rotor and fourth stator (S4) are of a second thickness. At the first overhaul, the first rotor, second stator, fourth rotor and end plate are removed and replaced with disks having a wear portion of a first thickness, except the end plate is replaced with a disk having a wear portion of a second thickness. All other disks remain in the same position. The reassembled brake stack is shown in Run 2, Configuration B, FIG. 9. At the second overhaul, the pressure plate, first stator, third rotor and fourth stator are substantially worn and removed and replaced with disks having a wear portion of a first thickness, except the pressure plate is replaced with a disk having a wear portion of a second thickness. The reassembled brake stack is shown in Run 3, Configuration C, FIG. 9.

At the third overhaul, the second rotor, third stator, fifth rotor, and end plate are substantially worn and replaced with disks having an available wear portion of a first thickness, except the end plate is replaced with a disk having a wear portion of a second thickness. All other disks remain in the same position. After this third overhaul, the brake configuration is the same as the initial brake configuration, except the pressure plate disk is of a third thickness and the end plate disk is of a second thickness.

With this proposed configuration, as well as other configurations described herein, the partially worn brake disks can be machined first and reinstalled into their respective positions at each overhaul. Alternatively, the rotors and stators can be rearranged within the stack to modify the thermal profile of the resulting brake stack, as desired.

The invention also contemplates the method of assembling and overhauling a disk brake having disks of three different thicknesses. At a first overhaul, the available wear portions of the disks having a first thickness are about equal to the initial available wear portions of disks having a second thickness. Similarly, at the first overhaul, the available wear portions of the disks having a second thickness are about equal to the initial available wear portions of disks having a third thickness. Also at the first overhaul, the available wear portions of the disks having a third thickness are substantially worn. Also, the disk stack may re-rearranged and the worn disks are replaced with refurbished disks or new disks. Therefore, as explained in detail above, the disk(s) having an available wear portion of a first thickness are replaced upon overhaul after the third complete service run, when these disks are substantially worn. Disks having an available wear portion of a second thickness are replaced or refurbished upon overhaul after the second complete service run. Disks having an available wear portion of a third thickness are replaced or refurbished at the overhaul after the first service run.

An aircraft brake assembly incorporating the novel configuration according to the instant invention is much more economical than conventional aircraft brake assemblies. If the disks are constructed as described in U.S. Pat. No. 5,779,006, the structural carrier or core of each disk can be reused if desired since, the disks are refurbished by the placement of new friction lining. Moreover, disks constructed according to U.S. Pat. No. 5,779,006 can be disassembled and then reassembled with friction facings from the same disk; or from other disks. The wear portion on one friction face can be different from the wear portion of the other friction face if desired, provided that the objectives of this invention are met.

In summary, a novel and unobvious brake disk stack has been described, as well as the method of assembly of a disk brake having disks of three different thicknesses so that the thickest disk is replaced or refurbished after the third service run. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

We claim:

1. A brake disk assembly comprising an end plate, a pressure plate, three rotors, and two stators interleaved between said rotors, and disposed between said end plate and pressure plate, wherein said pressure plate, end plate, rotors and stators comprise brake disks having wear faces, said brake disks comprising first thickness brake disks each having an initial first available wear portion on each wear face, second thickness brake disks each having an initial available wear portion on each wear face which is two thirds of the available wear portion on each wear face of the first thickness disks, and third thickness brake disks each having an initial available wear portion on each wear face which is one third of the available wear portion on each wear face of said first thickness disks, said brake disk assembly initially including disks of a first, second and third thickness, whereby at an overhaul the available wear portion on each wear face of each first thickness disk is about equal to the initial available wear portion on each wear face of second thickness disks, and the available wear portion on each wear face of disk of said second thickness brake disks is about equal to the initial available wear portion on each wear face of said third thickness disks and said available wear portion on each wear face of third thickness disk is substantially fully worn and said third thickness disks are replaced by disks of a first, second or third thickness.

2. A brake disk assembly comprising an end plate, a pressure plate, four rotors, and three stators interleaved between said rotors and disposed between said end plate and pressure plate, wherein said pressure plate, end plate, rotors and stators comprise brake disks having wear faces, said brake disks comprising first thickness brake disks each having an initial first available wear portion on each wear face, second thickness brake disks each having an initial available wear portion on each wear face which is two thirds of the available wear portion on the wear face of the first thickness brake disks, and third thickness brake disks each having an initial available wear portion on each wear face which is one third of the available wear portion on each wear face of disk of said first thickness brake disks, said brake disk assembly initially including disks of a first, second and third thickness, whereby at an overhaul the available wear portion on each wear face of each first thickness brake disks is about equal to the initial available wear portion on each wear face of disk of said second thickness brake disks, and the available wear portion on each wear face of a second thickness brake disk is about equal to the initial available wear portion on each wear face of said third thickness brake disks and said available wear portion on each wear face of said third thickness disks is substantially fully worn, whereby said third thickness disks are removed and replaced with disks of a first, second or third thickness.

3. A brake disk assembly according to claim 2, wherein the pressure plate and end plate are provided with wear portions of differing thicknesses to maintain a constant overall assembly length at each overhaul.

4. A brake disk assembly according to claim 2, wherein the assembly includes one of a pressure plate and an end plate with a wear portion of about two times the thicknesses of the other one of said pressure plate and said end plate.

5. A brake disk assembly comprising an end plate, a pressure plate, five rotors, and four stators interleaved between said rotors and disposed between said end plate and pressure plate, wherein said rotors and stators comprise brake disks having wear faces, said brake disks comprising first thickness brake disks each having an initial first available wear portion on each wear face, second thickness brake disks each having an initial available wear portion on each wear face which is two thirds of the available wear portion on each wear face of the first thickness brake disks, and third thickness brake disks each having an initial available wear portion on each wear face which is one third of the available wear portion on each wear face of said first thickness brake disks, said brake disk assembly initially including disks of a first, second and third thickness whereby after an overhaul the available wear portion on each wear face of said first thickness brake disks is about equal to the initial available wear portion on each wear face of said second thickness brake disks, and the available wear portion on each wear face of each disk of said second thickness brake disks is about equal to the initial available wear portion on each wear face of said third thickness disks and said available wear portion on each wear face of said third thickness disks is substantially fully worn, and said third thickness disks are removed and replaced with disks of a first, second or third thickness.

* * * * *